US012614425B2

(12) United States Patent
Yang

(10) Patent No.: US 12,614,425 B2
(45) Date of Patent: Apr. 28, 2026

(54) BANKNOTE VALIDATION DEVICE HAVING RAPID REPLACEMENT PANEL

(71) Applicant: CHENGDING INDUSTRIAL CO., LTD., Taoyuan City (TW)

(72) Inventor: Cheng-Wen Yang, Taoyuan City (TW)

(73) Assignee: CHENGDING INDUSTRIAL CO., LTD., Taoyuan City (TW)

( * ) Notice: Subject to any disclaimer, the term of this patent is extended or adjusted under 35 U.S.C. 154(b) by 323 days.

(21) Appl. No.: 18/357,833

(22) Filed: Jul. 24, 2023

(65) Prior Publication Data

US 2025/0037529 A1 Jan. 30, 2025

(51) Int. Cl.

*G07D 11/40* (2019.01)
*G07D 7/12* (2016.01)
*G07D 11/14* (2019.01)

(52) U.S. Cl.

CPC ............... *G07D 11/40* (2019.01); *G07D 7/12* (2013.01); *G07D 11/14* (2019.01); *G07D 2207/00* (2013.01); *G07D 2211/00* (2013.01)

(58) Field of Classification Search

CPC ........ G07D 11/40; G07D 11/14; G07D 11/12; G07D 7/12; G07D 11/26
USPC .................................................. 235/379, 375
See application file for complete search history.

(56) References Cited

U.S. PATENT DOCUMENTS

| | | | | |
|---|---|---|---|---|
| 5,564,545 A * | 10/1996 | Suzuki | G07D 11/125 | 271/180 |
| 5,730,271 A * | 3/1998 | Buchman | B65H 29/46 | 271/181 |
| 6,047,886 A * | 4/2000 | Saltsov | G07D 7/12 | 235/475 |
| 8,348,043 B2 * | 1/2013 | Smith | G07D 11/26 | 194/350 |
| 2006/0021848 A1 * | 2/2006 | Smith | G07F 19/202 | 194/350 |

* cited by examiner

*Primary Examiner* — Paultep Savusdiphol
(74) *Attorney, Agent, or Firm* — MUNCY, GEISSLER, OLDS & LOWE, P.C.

(57) ABSTRACT

This disclosure reveals a banknote validation device having a rapid replacement panel. It is a device that can replace different front covers based on the installed machine model and a banknote validation device with banknote validation functions. This disclosure includes a front cover and a rear housing. The main purpose of this disclosure is to utilize a hardware design with a manner of interchangeable front cover. It eliminates the need of replacing the entire set of banknote validation devices due to different requirements for banknote insertion height in different machine models. By placing the circuit board in the rear housing, the problem of having to remove the circuit board when performing banknote jam maintenance at the banknote insertion port of the front cover is effectively avoided, therefore saving time on maintenances.

9 Claims, 11 Drawing Sheets

A-B

BANKNOTE VALIDATION DEVICE HAVING RAPID REPLACEMENT PANEL

BACKGROUND

1. Technical Field

This disclosure relates to a banknote validation device having a rapid replacement panel, particularly a device that can replace different front covers based on the installed machine model to achieve rapid variation in the height of the banknote insertion port of the banknote validation device.

2. Description of Related Art

With the advancement of the automation industry and to address issues such as misjudgment or time consumption in manual billing, specialized vending machines for selling food and banknote exchange machines installed in amusement parks for players to exchange banknotes have emerged. The use of these automated machines to replace manpower or to regulate and distribute service demands during peak hours has proven to be highly effective and has become the preferred solution for many businesses.

Currently available vending machines and coin exchange machines are typically composed of a dedicated banknote collection device combined with other hardware components. Taking vending machines for selling beverages as an example, they are mainly controlled by a computer that connects electrically to a banknote validation device and a beverage storage cabinet. When a consumer selects a beverage for purchase and inserts money into the banknote validation device, the computer control system dispenses the pre-purchased beverage from the storage cabinet to the consumer. The money collection device is usually produced separately by another vendor and then integrated with the vending machine or banknote exchange machine. However, since each vendor produces vending machines or banknote exchange machines with different designs, the available space for installing the banknote validation device varies. As a result, banknote validation device manufacturers need to design different hardware for different installation positions, which incurs significant costs in product development and design. Therefore, it is crucial for developers and researchers in the banknote validation device industry to continuously strive to overcome and address this challenge by innovative hardware design that may effectively support different machine models' banknote insertion height, thus saving costs in product design and development.

SUMMARY

Based on the above, the inventor, with extensive expertise and years of practical experience, has improved and created a banknote validation device with a rapid replacement panel. The purpose is to provide a device that can replace different front covers based on the installed machine model, enabling rapid variation in the height of the banknote insertion port of the banknote validation device. This is mainly achieved through a hardware design with a manner of interchangeable front cover. It eliminates the need of replacing the entire set of banknote validation devices due to different requirements for banknote insertion height in different machine models. By placing the circuit board in the rear housing, the problem of having to remove the circuit board when performing banknote jam maintenance at the banknote insertion port of the front cover is effectively avoided, therefore saving time on maintenances. The main advantages such as maintenance time may be saved and support for different machine models in terms of banknote insertion height, convenient maintenance, preventing coins from directly entering the machine through the banknote insertion port, precise banknote validation and anti-theft functionality may be achieved.

In accordance with the objective of this disclosure, a banknote validation device having a rapid replacement panel is provided, at least comprising a front cover and a rear housing. The front cover includes a first main body, a banknote insertion port opened at one face of the first main body and first locking portions respectively arranged at two ends of the first main body. The rear housing includes a second main body, a banknote dispensing port opened at one face of the second main body and second locking portions respectively arranged at the two ends of the second main body, wherein the second locking portions corresponds to and locks with the first locking portions to allow the rear housing to be correspondingly coupled with the front cover.

In one embodiment of this disclosure, the first locking portions are in concave configuration, while the second locking portions are in convex configuration in a corresponding manner to lock with the first locking portion.

In one embodiment of this disclosure, the first main body may further enclose a first accommodating space in communication with the banknote insertion port and the second main body may further enclose a second accommodating space in communication with the banknote dispensing port. When the front cover is correspondingly coupled to and locked with the rear housing, the first accommodating space and the second accommodating space are interconnected.

In one embodiment of this disclosure, the banknote insertion port may further connect to a first channel located in the first accommodating space.

In one embodiment of this disclosure, the first channel may be in one of a sunken or raised configuration.

In one embodiment of this disclosure, the banknote dispensing port may be further arranged with a second channel connected to the first channel. After a banknote enters the banknote validation device having the rapid replacement panel through the banknote insertion port, the banknote passes through the first channel and the second channel before exits the banknote validation device having the rapid replacement panel through the banknote dispensing port.

In one embodiment of this disclosure, a lower end of the second channel may be further arranged with a conveying module for conveying the banknote.

In one embodiment of this disclosure, the conveying module may further include a motor, a worm connected to the motor, a worm gear connected to the worm, at least one belt connected to the worm gear and at least one roller connected to the belt and in contact with the banknote. The power generated by the motor is transmitted through the worm, the worm gear and the belt to drive the roller and convey the banknote.

In one embodiment of this disclosure, the second accommodating space may further accommodate a circuit board.

In one embodiment of this disclosure, a lower end of the first channel may be further arranged with a light guide plate and the circuit board may be further arranged with at least one light source emitting light towards the light guide plate.

In one embodiment of this disclosure, two faces of the second channel may be further arranged with multiple corresponding inspection modules, which are for inspecting authenticity of the banknote.

In one embodiment of this disclosure, an end of the second channel facing the banknote dispensing port may be further arranged with multiple raised ribs.

In summary, the banknote validation device having the rapid replacement panel of this disclosure primarily utilizes a hardware design with a manner of interchangeable front cover. It eliminates the need of replacing the entire set of banknote validation devices due to different requirements for banknote insertion height in different machine models. By placing the circuit board in the rear shell, the problem of having to remove the circuit board when performing banknote jam maintenance at the banknote insertion port of the front cover is effectively avoided. Thus, the main advantages such as maintenance time may be saved and support for different machine models in terms of banknote insertion height, convenient maintenance, preventing coins from directly entering the machine through the banknote insertion port, precise banknote validation and anti-theft functionality may be achieved.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
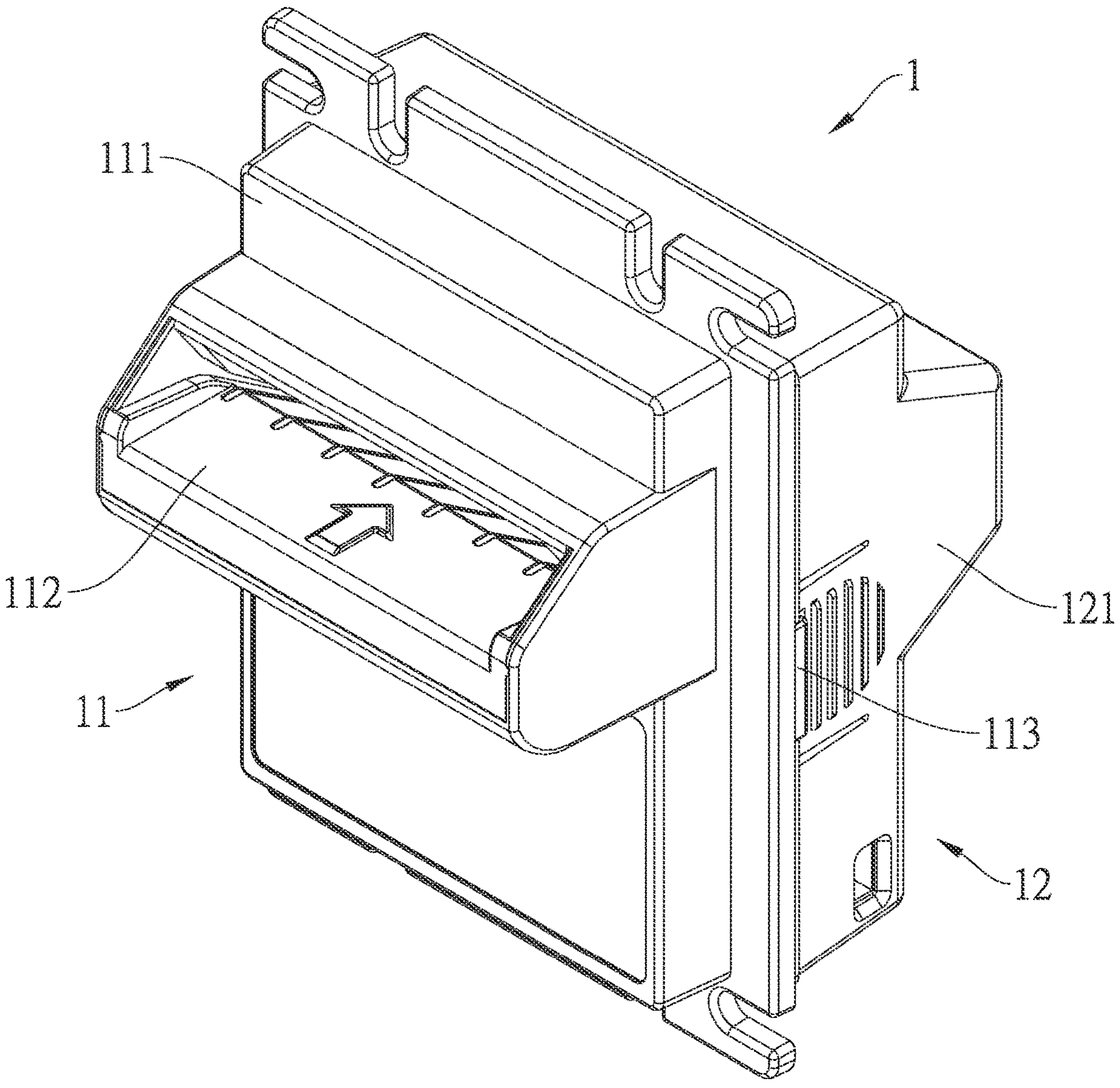
FIG. 1 is an overall device front view of a preferred embodiment of the banknote validation device having the rapid replacement panel of the present disclosure.
Figure 2:
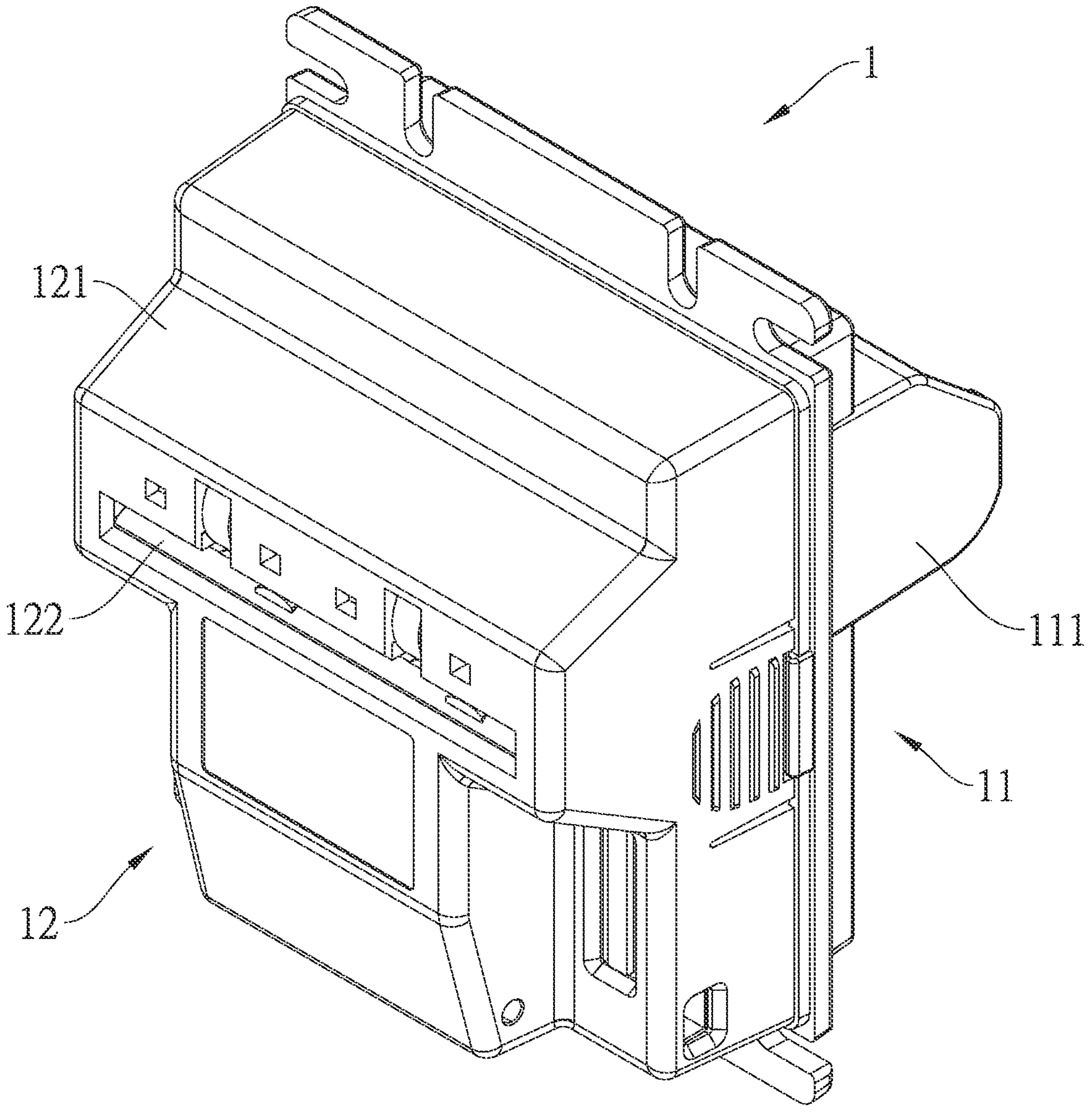
FIG. 2 is an overall device rear view of a preferred embodiment of the banknote validation device having the rapid replacement panel of the present disclosure.
Figure 3:
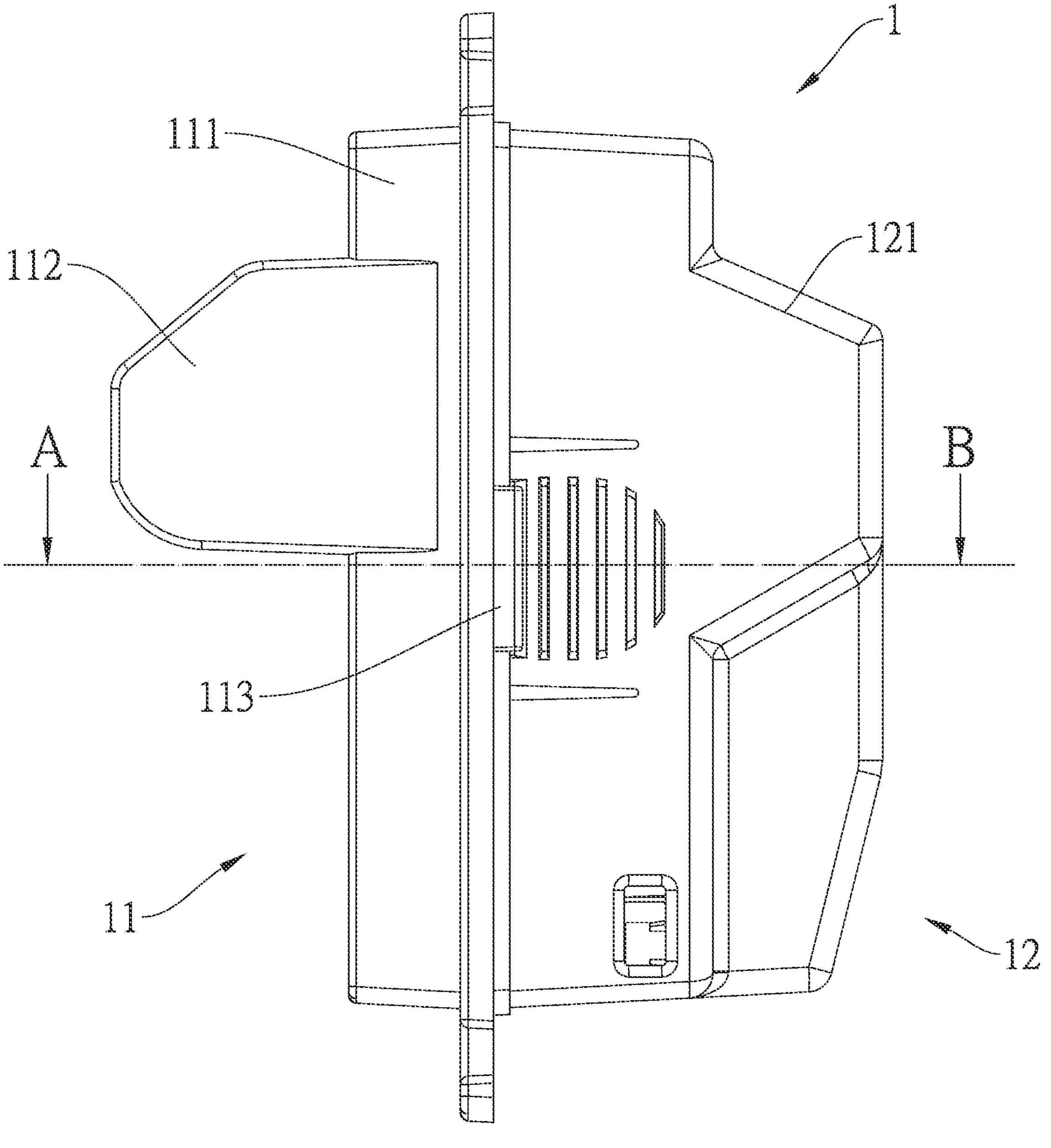
FIG. 3 is an overall device cross-sectional view of a preferred embodiment of the banknote validation device having the rapid replacement panel of the present disclosure.
Figure 4:
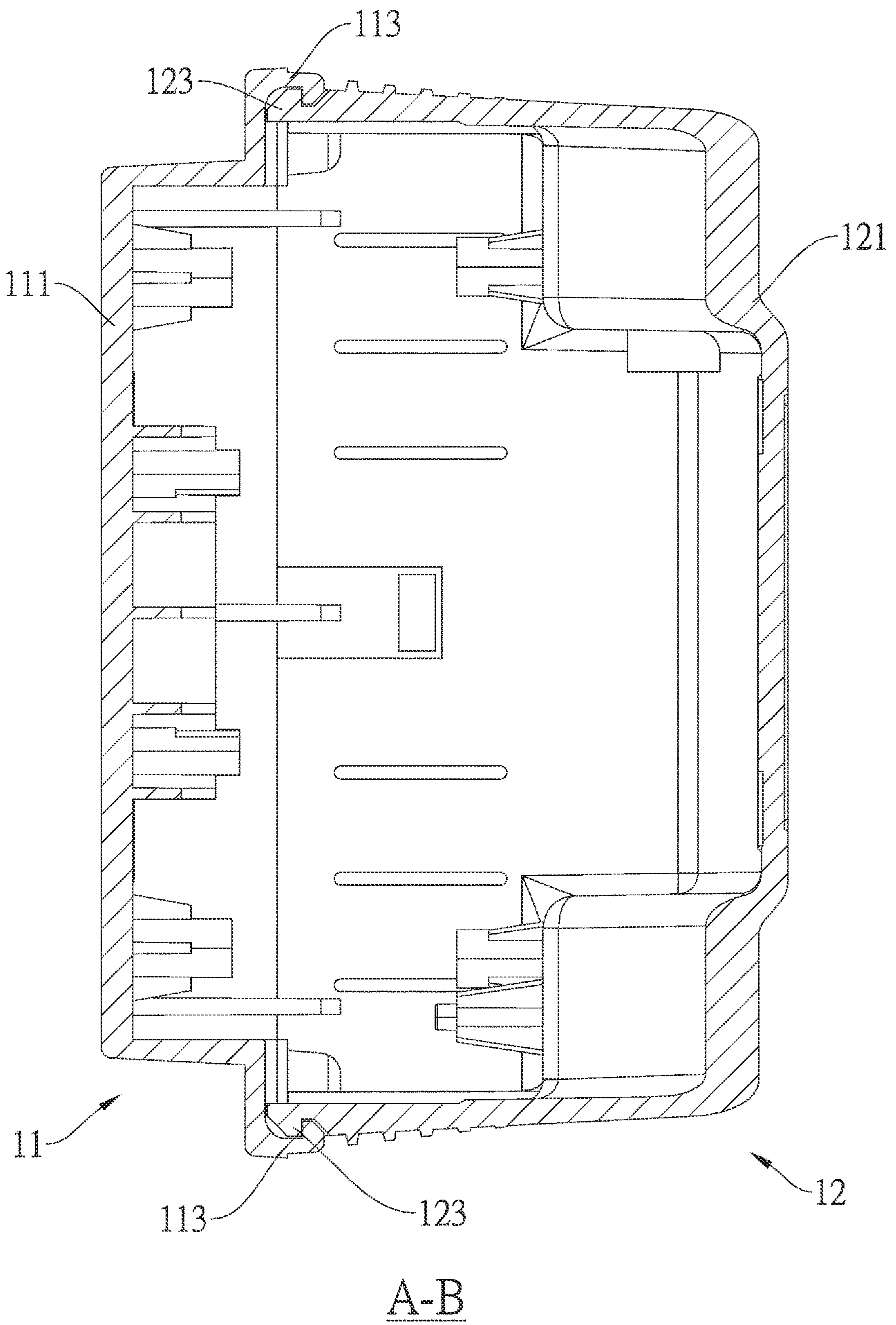
FIG. 4 is a cross-sectional view along line AB of a preferred embodiment of the banknote validation device having the rapid replacement panel of the present disclosure.
Figure 5:
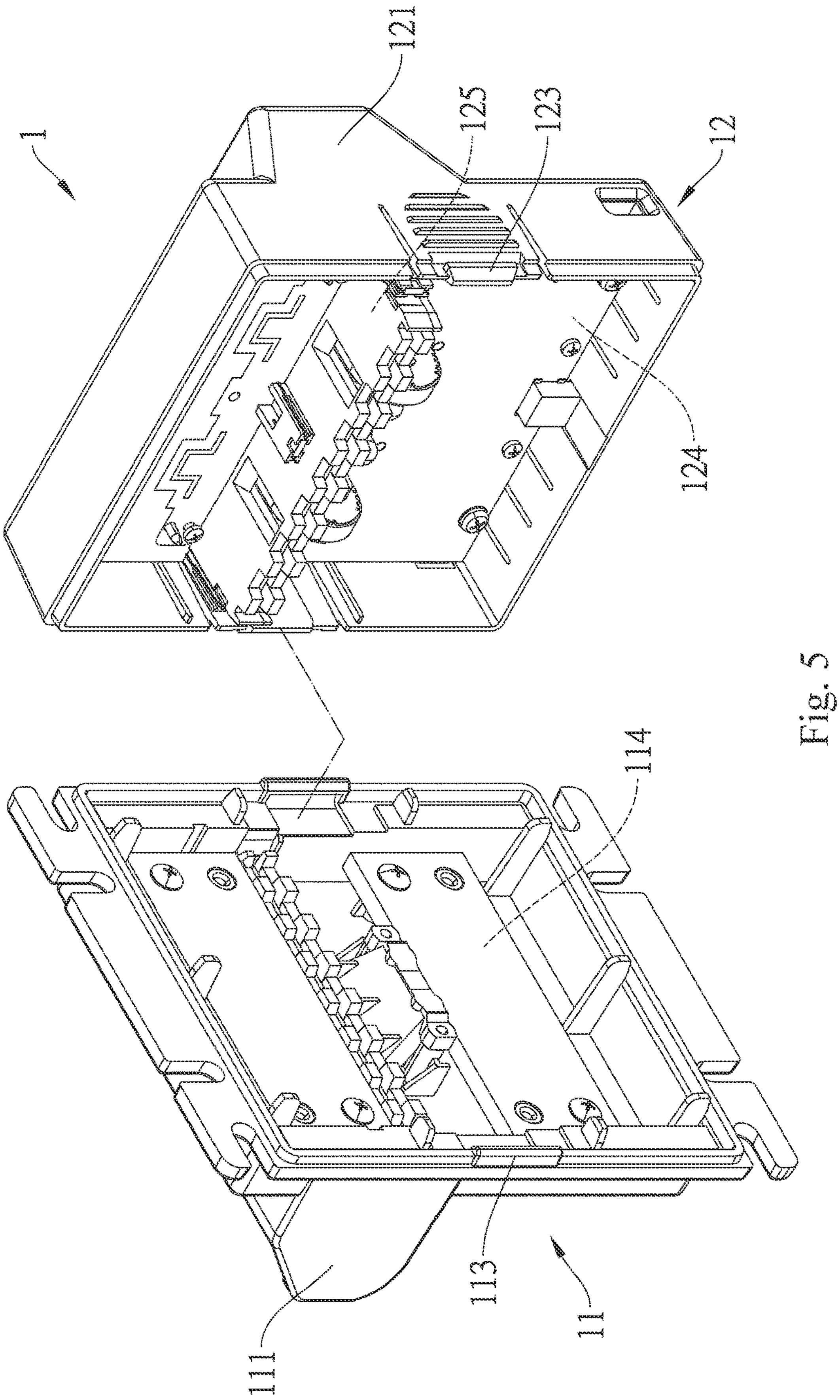
FIG. 5 is a device assembly schematic diagram of a preferred embodiment of the banknote validation device having the rapid replacement panel of the present disclosure.
Figure 6:
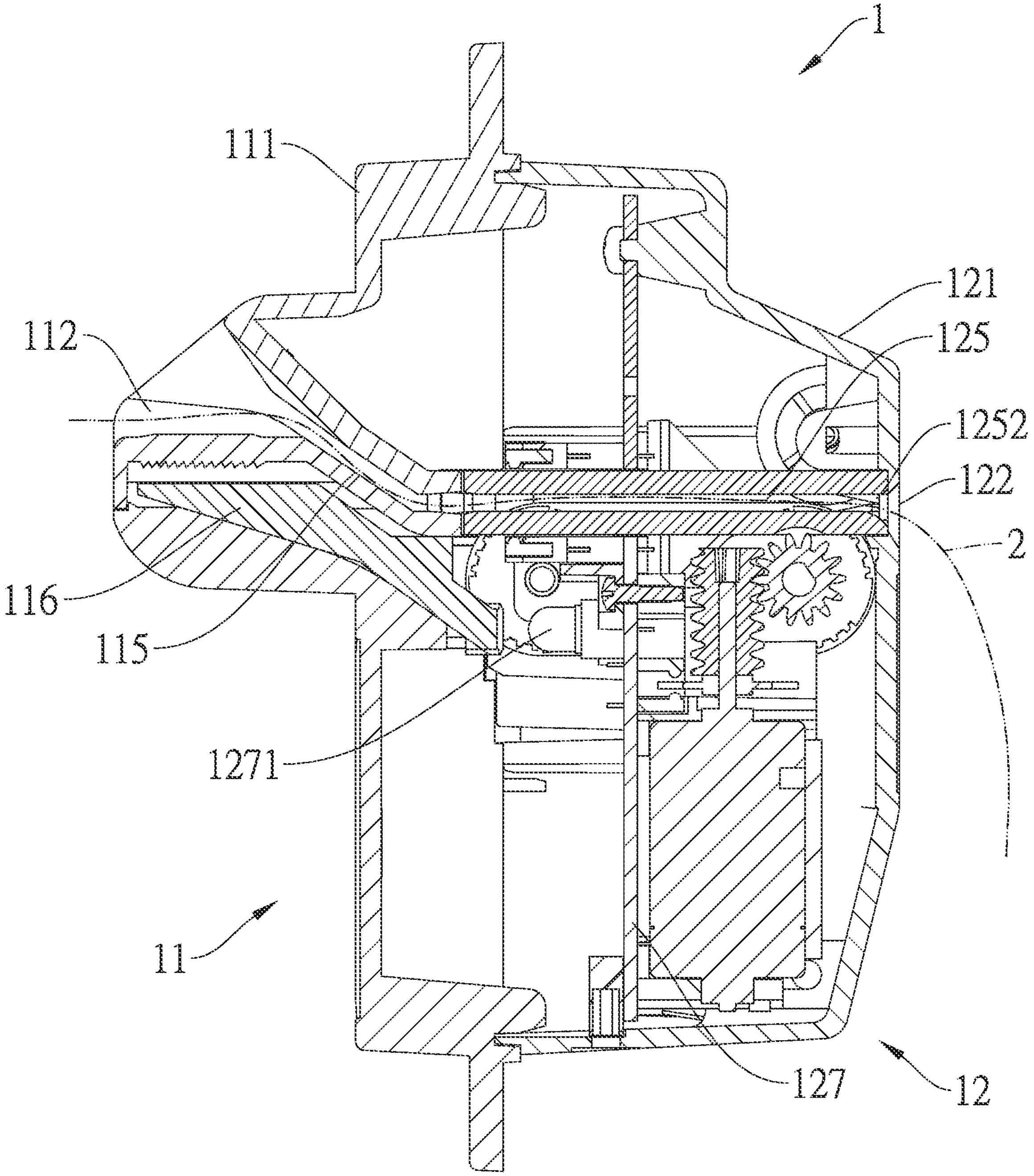
FIG. 6 is an illustration of the operation of the banknote validation of a preferred embodiment of the banknote validation device having the rapid replacement panel of the present disclosure.
Figure 7:
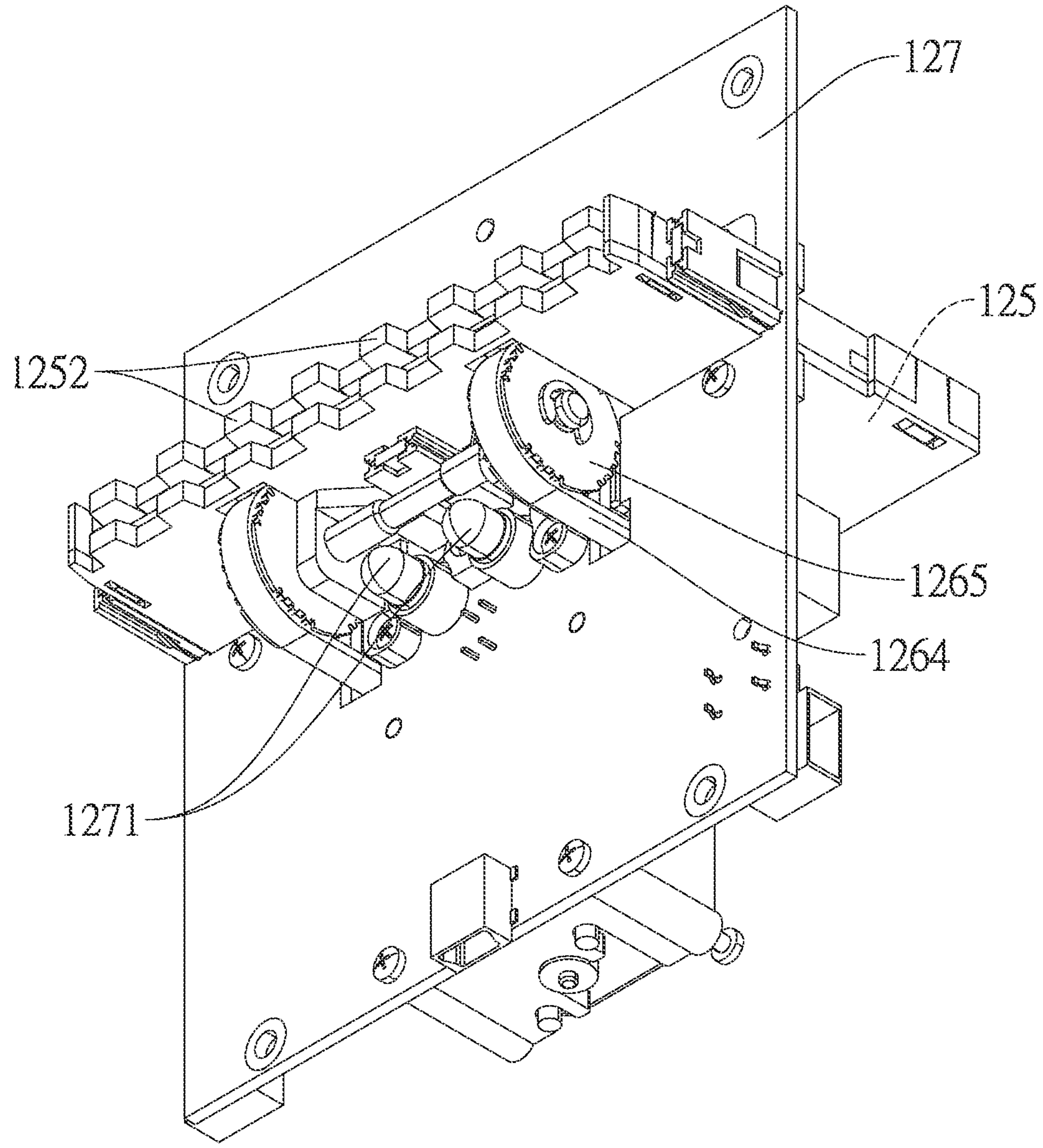
FIG. 7 is a front view of the rear housing assembly of a preferred embodiment of the banknote validation device having the rapid replacement panel of the present disclosure.
Figure 8:
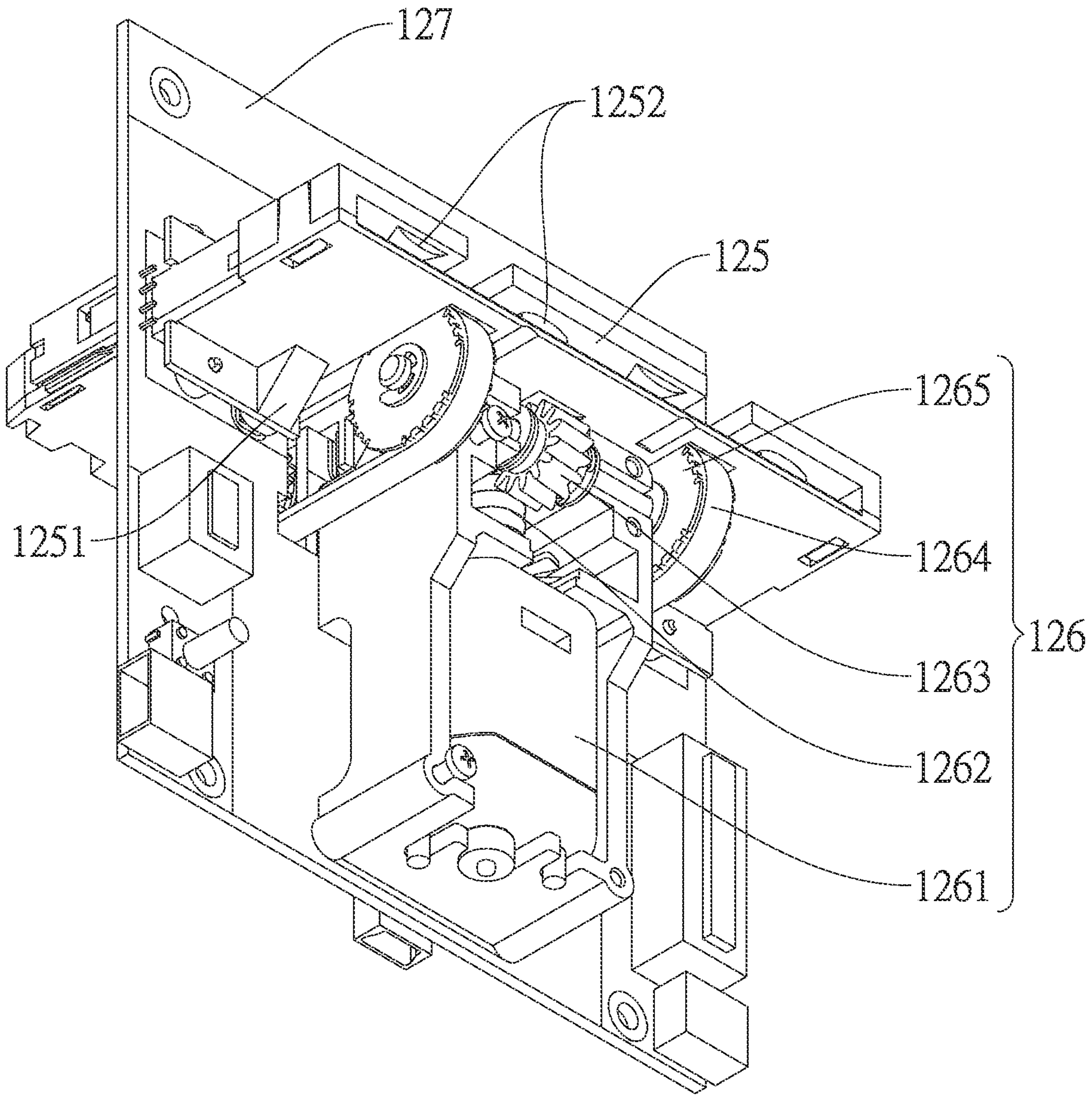
FIG. 8 is a rear view of the rear housing assembly of a preferred embodiment of the banknote validation device having the rapid replacement panel of the present disclosure.

In order to facilitate the understanding of the technical features, content, advantages, and effects achieved by the present disclosure by esteemed examiners, the present disclosure will be described in detail with reference to the accompanying drawings, using the expression form of exemplary embodiments. The content of the embodiments is provided as an illustrative example and does not limit the scope of protection intended by the present disclosure. Other features, components, or parameters may be used to implement the present disclosure. The embodiments are presented to exemplify the scope of the patent application of the present disclosure. Those skilled in the art will be able to make equivalent modifications and variations within the spirit of the present disclosure based on the description provided in the following specification. It should be noted that, according to common practices in the industry, the proportions of various features are not drawn to scale. In fact, the size of the components can be arbitrarily enlarged or reduced to clearly demonstrate the features of the present disclosure.

First, referring to FIGS. 1 to 5, the overall device front view, the overall device rear view, the overall device cross-sectional view, the cross-sectional view along line AB and the device assembly schematic diagram of the preferred embodiment of the banknote validation device having the rapid replacement panel of the present disclosure are shown. The banknote validation device having the rapid replacement panel (1) of the present disclosure is at least composed of a front cover (11) and a rear housing (12). The banknote validation device having the rapid replacement panel (1) is designed to be installed on machines capable of validating banknotes, such as but not limited to parking payment machines or banknote exchange machines in the amusement parks. Thus, the banknote validation device having the rapid replacement panel (1) of the present disclosure primarily utilizes a hardware design with a manner of interchangeable front cover (11). It eliminates the need of replacing the entire set of banknote validation devices due to different requirements for banknote insertion height in different machine models. By placing the circuit board (127) in the rear housing (12), the problem of having to remove the circuit board (127) when performing banknote jam maintenance at the banknote insertion port (112) of the front cover (11) is effectively avoided, therefore saving time on maintenances. The main advantages such as maintenance time may be saved and support for different machine models in terms of banknote insertion height by replacing the front cover (11), convenient maintenance, preventing coins from directly entering the banknote validation device having the rapid replacement panel (1) through the banknote insertion port (112), precise banknote validation and anti-theft functionality may be achieved.

The front cover (11) is at least composed of a first main body (111), a banknote insertion port (112), two first locking portions (113), a first accommodating space (114), a first channel (115) and a light guide plate (116). The banknote insertion port (112), presented in a rectangular shape, is located at one face of the first main body (111). The first channel (115) is connected to the banknote insertion port (112), allowing a banknote (2) to enter the banknote validation device having the rapid replacement panel (1) through the banknote insertion port (112) and then pass through the first channel (115) into the rear housing (12). Additionally, the first accommodating space (114) is enclosed by the first main body (111) and the first channel (115) is located within the first accommodating space (114). To fulfill requirements for banknote insertion height in different machine models, in a preferred embodiment of the present disclosure, the first channel (115) is in a sunken configuration to enter the banknote validation device having the rapid replacement panel (1) and the sunken angle of the first channel (115) may prevent unauthorized individuals from inserting coins into the banknote insertion port (112), thus avoiding damage to the banknote validation device having the rapid replacement panel (1) caused by coin insertion.

The rear housing (12) is at least composed of a second main body (121), a banknote dispensing port (122), two second locking portions (123), a second accommodating space (124), a second channel (125), a conveying module (126) and a circuit board (127). The banknote dispensing port (122), presented in a rectangular shape, is located at one face of the second main body (121). The second channel (125) is respectively connected to the first channel (115) and the banknote dispensing port (122). After the banknote (2) enters the banknote validation device having the rapid replacement panel (1) through the banknote insertion port (112), the banknote (2) passes through the first channel (115) then passes through the second channel (125) located within the rear housing (12) and finally exits the banknote validation device having the rapid replacement panel (1) through the banknote dispensing port (122). The second accommodating space (124) is enclosed by the second main body (121) and the second channel (125) is located within the second accommodating space (124).

Furthermore, referring to FIGS. 3 and 4 again, FIG. 4 is a cross-sectional view along the line AB shown in FIG. 3. The two first locking portions (113) are respectively located at the two ends of the first main body (111) of the front cover (11) and each first locking portion (113) is in concave configuration. The two second locking portions (123) are respectively located at the two ends of the second main body (121) of the rear housing (12), corresponding to the positions of the first locking portions (113) and each second locking portion (123) is in convex configuration. When the second locking portions (123) locks in a corresponding manner with the first locking portions (113), the rear housing (12) and the front cover (11) may correspondingly lock to each other securely and not becoming loose easily. The first accommodating space (114) and the second accommodating space (124) are interconnected. It should be noted that the specific locking method between the first locking portions (113) and the second locking portions (123) is for illustrative purposes and should not be considered as limiting the actual implementation of the present disclosure. Those skilled in the art would understand that as long as the front cover (11) and the rear housing (12) can be correspondingly locked to each other securely without detachment, the actual implementation of the present disclosure shall not be affected.

Furthermore, after the banknote (2) enters the banknote validation device having the rapid replacement panel (1) through the banknote insertion port (112) and passes through the first channel (115) to the second channel (125) in the rear housing (12), the lower end of the second channel (125) is arranged with a conveying module (126) for conveying the banknote (2). The conveying module (126) is at least composed of a motor (1261), a worm (1262), a worm gear (1263), at least one belt (1264) and at least one roller (1265). In other words, the motor (1261) generates power, and the worm (1262), worm gear (1263) and belt (1264) transmit the power from the motor (1261) to the roller (1265) that contacts the banknote (2), causing the banknote (2) to be conveyed toward the direction of the banknote dispensing port (122).

In addition, the circuit board (127) is placed in the second accommodating space (124) of the rear housing (12). In one preferred embodiment, placing the circuit board (127) in the rear housing (12) has the advantage that when a maintenance worker is repairing the banknote jam at the banknote insertion port (112) of the front cover (11), they only need to separate the front cover (11) and the rear housing (12) to remove the banknotes (2) jammed in the banknote insertion port (112) without the need to remove the circuit board (127) located in the first cavity space (114) of the front cover (11) as traditionally required. This effectively reduces the maintenance time.

Furthermore, the lower end of the first channel (115) is arranged with a light guide plate with transparent configuration (116). The light guide plate (116) may also be visible on the surface of the first main body (111) of the front cover (11). At least one light source (1271) is placed on the circuit board (127) and emits light toward the light guide plate (116). The light source (1271) may be, for example, but not limited to, a light-emitting diode (LED). In one preferred embodiment, when the banknote (2) enters the banknote validation device having the rapid replacement panel (1) through the banknote insertion port (112), it triggers the light source (1271) on the circuit board (127) to emit light toward the light guide plate (116). The light may pass through the light guide plate with transparent configuration (116) and be visible on the surface of the first main body (111). The user inserting the banknote (2) may understand that the banknote validation device having the rapid replacement panel (1) has indeed received the banknote (2) through the light emitted from the light guide plate (116).

Moreover, multiple corresponding inspection modules (1251) are placed on the upper and lower ends of the second channel (125). Two inspection modules (1251) on the upper end and the corresponding two inspection modules (1251) on the lower end form as a set of devices for inspecting the authenticity of the banknote (2). In one preferred embodiment, there are four inspection modules (1251) on each of the upper and lower ends of the second channel (125). The inspection module (1251) may be, for example, but not limited to, an optical sensing module. Mainly by emitting a light wave from the inspection module (1251) located on the lower end of the second channel (125) toward the inspection module (1251) on the corresponding position on the upper end of the second channel (125), the authenticity of the banknote (2) may be effectively determined by the banknote (2) passing through the second channel (125) that may be penetrated by the light.

Furthermore, the end portion of the second channel (125) facing the banknote dispensing port (122) is arranged with multiple raised ribs (1252). The function of these ribs (1252) is to prevent theft by preventing the banknotes (2) from being pulled back and retrieved from the banknote insertion port (112). In other words, when the banknote (2) enters the banknote validation device having the rapid replacement panel (1) through the banknote insertion port (112) and passes from the first channel (115) to the second channel (125) in the rear housing (12), the banknote (2) cannot be further retracted back into the second channel (125), the first channel (115), the banknote insertion port (112), or even outside the banknote validation device having the rapid replacement panel (1). This is because when the banknote (2) reaches the junction between the banknote dispensing port (122) and the second channel (125), the banknote (2) will come into contact with the raised ribs (1252) due to distortion or misalignment, preventing the banknote (2) from moving further towards the first channel (115). This design feature effectively prevents unauthorized individuals from retrieving the banknotes (2) that have been inserted into the banknote validation device having the rapid replacement panel (1).

Figure 9:
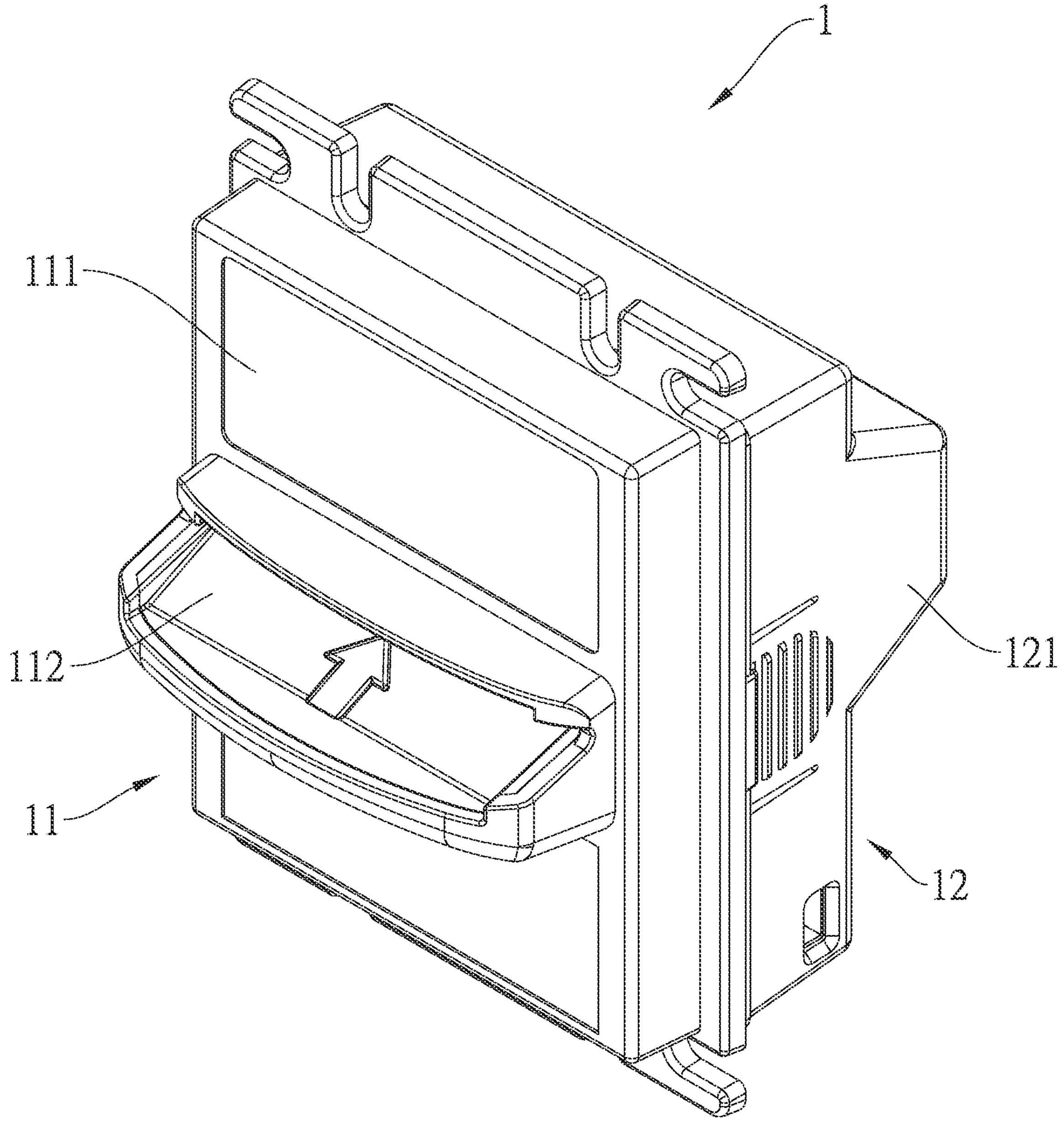
FIG. 9 is an overall device front view of another preferred embodiment of the banknote validation device having the rapid replacement panel of the present disclosure.
Figure 10:
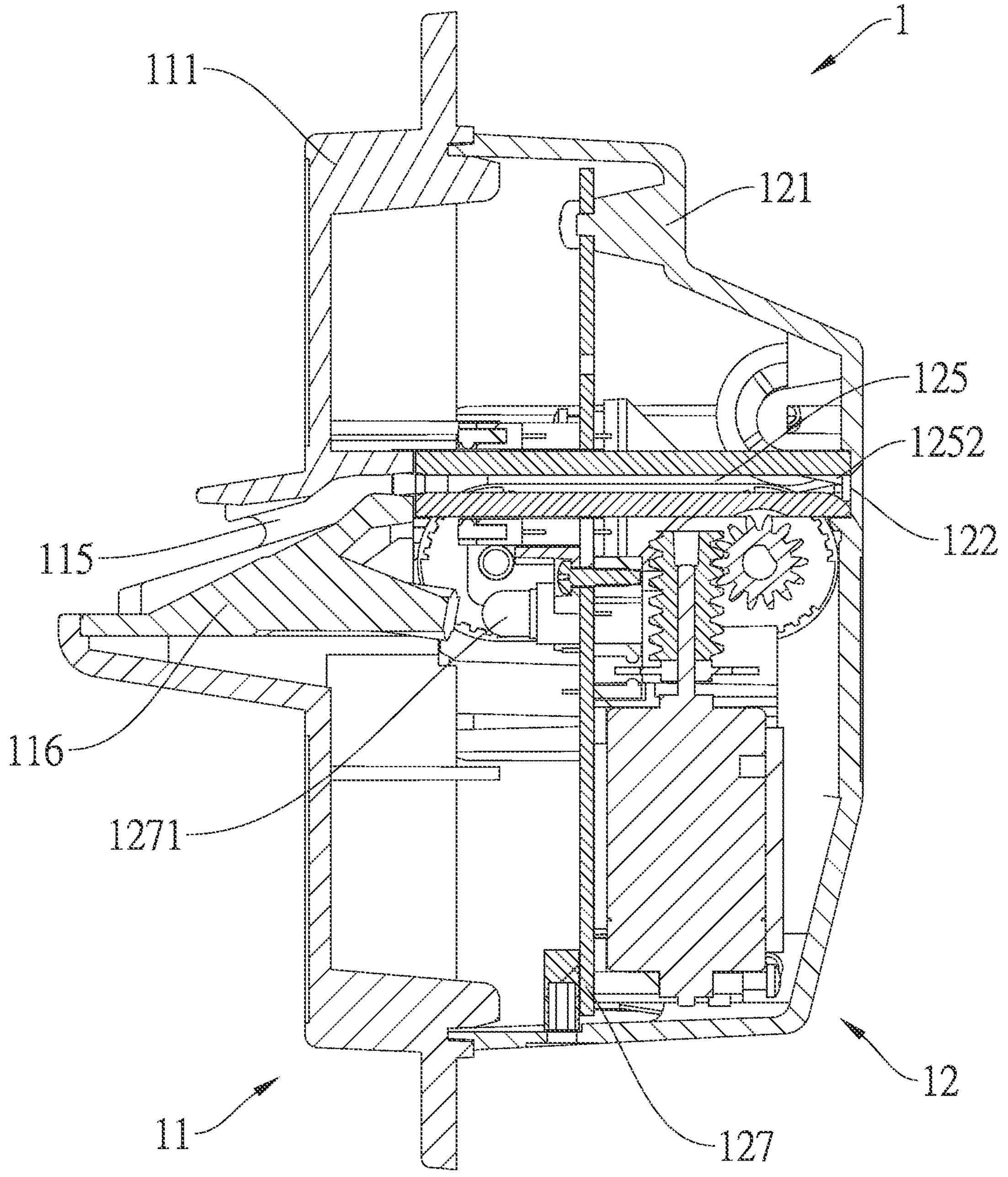
FIG. 10 is an illustration of the operation of the banknote validation of another preferred embodiment of the banknote validation device having the rapid replacement panel of the present disclosure.
Figure 11:
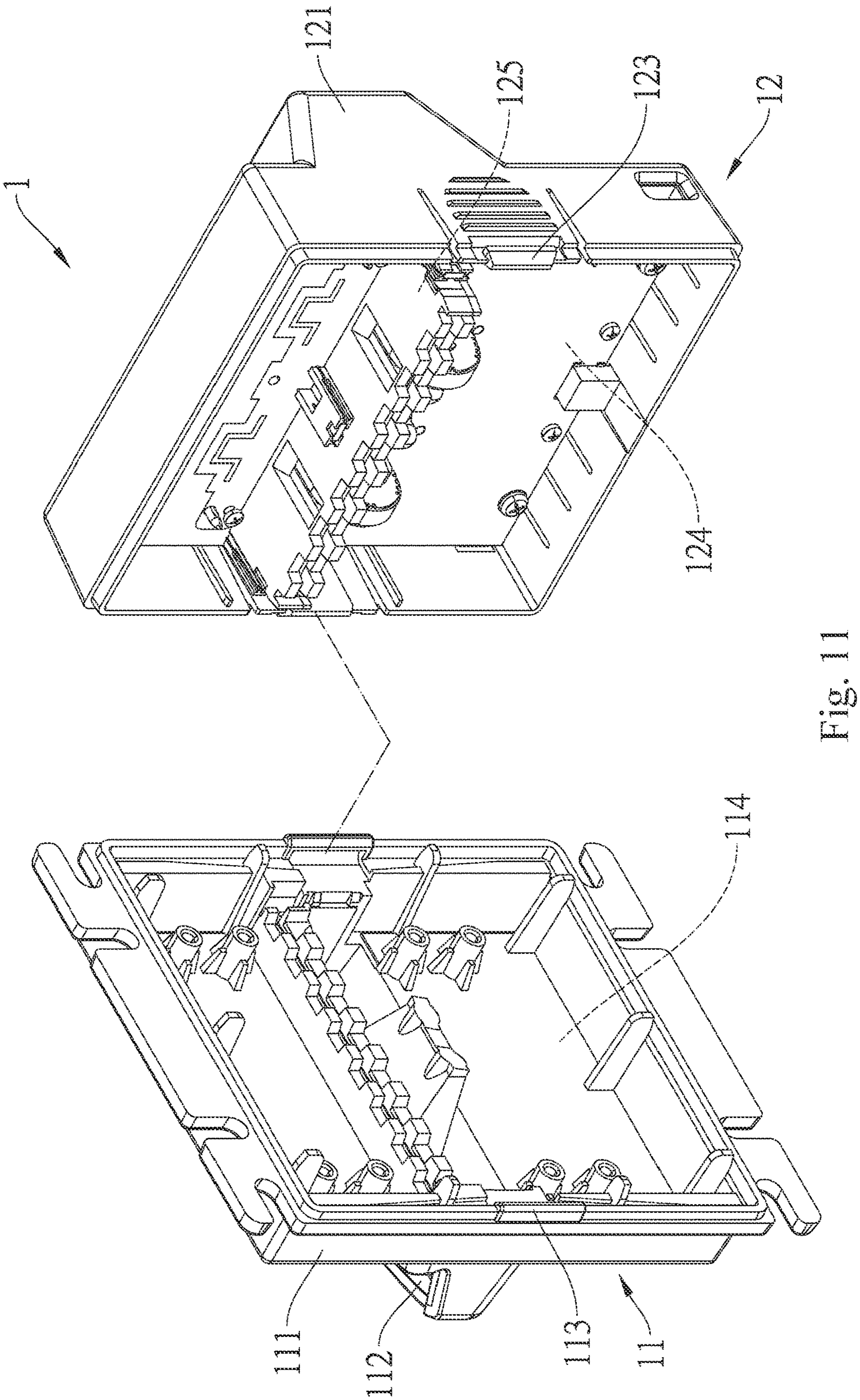
FIG. 11 is a device assembly schematic diagram of another preferred embodiment of the banknote validation device having the rapid replacement panel of the present disclosure.

Additionally, referring to FIGS. 9 to 11, which show the overall front view, illustration of the operation of the banknote validation and the device assembly schematic diagram of another preferred embodiment of the banknote validation device with rapid replacement panel. The difference between this preferred embodiment and the previous one lies in the connection between the banknote insertion port (112) and the first channel (115), which exhibits in a raised configuration due to difference in the height of the banknotes inserted in the machine, the banknotes (2) entering the banknote validation device having the rapid replacement panel (1) through the banknote insertion port (112) will then pass from the first channel (115) to the second channel (125) in the rear housing (12) and finally exit the banknote validation device having the rapid replacement panel (1) through the banknote dispensing port (122). In other words, the banknote validation device having the rapid replacement panel of this disclosure may support different requirements for banknote insertion height in different machine models by simply replacing the front cover (11) without the need of replacing the entire set of the banknote validation device having the rapid replacement panel (1). This effectively saves hardware costs.

From the above description of the embodiments, it may be concluded that the banknote validation device having the rapid replacement panel of this disclosure has the following advantages compared to existing technologies and products:

The main purpose of this disclosure is to utilize a hardware design with a manner of interchangeable front cover. It eliminates the need of replacing the entire set of banknote validation devices due to different requirements for banknote insertion height in different machine models. By placing the circuit board in the rear housing, the problem of having to remove the circuit board when performing banknote jam maintenance at the banknote insertion port of the front cover is effectively avoided, therefore saving time on maintenances. The main advantages such as maintenance time may be saved and support for different machine models in terms of banknote insertion height, convenient maintenance, preventing coins from directly entering the machine through the banknote insertion port, precise banknote validation and anti-theft functionality may be achieved.

In conclusion, the banknote validation device having the rapid replacement panel of this disclosure may indeed achieve the intended operational effects as disclosed in the embodiments above. Furthermore, this disclosure has not been previously disclosed before the application and fully complies with the requirements and provisions of patent law. Therefore, a new patent application is respectfully submitted for examination and approval. Your favorable consideration and granting of the patent would be greatly appreciated.

However, the illustrations and descriptions provided above are only exemplary embodiments of this disclosure and should not be construed as limiting the scope of protection for this disclosure. Those skilled in the art will recognize that other equivalent variations or modifications within the scope of the features of this disclosure should also be considered as falling within the design scope of this disclosure.

What is claimed is:

1. A banknote validation device having a rapid replacement panel, at least comprising:

a front cover including a first main body, a banknote insertion port opened at one face of the first main body and first locking portions respectively arranged at two ends of the first main body; and a rear housing including a second main body, a banknote dispensing port opened at one face of the second main body and second locking portions respectively arranged at two ends of the second main body;

wherein the second locking portions corresponding to and locking with the first locking portions to allow the rear housing to be correspondingly coupled with the front cover;

wherein the first main body further encloses a first accommodating space in communication with the banknote insertion port and the second main body further encloses a second accommodating space in communication with the banknote dispensing port;

when the front cover is correspondingly coupled to and locked with the rear housing, the first accommodating space and the second accommodating space are interconnected:

wherein the banknote insertion port further connects to a first channel located in the first accommodating space;

wherein the banknote dispensing port is further arranged with a second channel connected to the first channel; and wherein the second accommodating space further accommodates a circuit board disposed in the rear house.

2. The banknote validation device having the rapid replacement panel according to claim 1, wherein the first locking portions have a concave configuration and the second locking portions have a convex configuration corresponding to the first locking portions.

3. The banknote validation device having the rapid replacement panel according to claim 1, wherein the first channel is in one of sunken or raised configuration.

4. The banknote validation device having the rapid replacement panel according to claim 1, wherein after a banknote, enters the banknote validation device having the rapid replacement panel through the banknote insertion port, the banknote passes through the first channel and the second channel before exits the banknote validation device having the rapid replacement panel through the banknote dispensing port.

5. The banknote validation device having the rapid replacement panel according to claim 4, wherein the lower end of the second channel is further arranged with a conveying module for conveying the banknote.

6. The banknote validation device having the rapid replacement panel according to claim 5, wherein the conveying module further comprises a motor, a worm connected to the motor, a worm gear connected to the worm, at least one belt connected to the worm gear, and at least one roller connected to the belt and in contact with the banknote; power generated by the motor is transmitted through the worm, the worm gear and the belt to drive the roller and convey the banknote.

7. The banknote validation device having the rapid replacement panel according to claim 4, wherein the two faces of the second channel are further arranged with multiple corresponding inspection modules, and the inspection modules are for inspecting authenticity of the banknote.

8. The banknote validation device having the rapid replacement panel according to claim 4, wherein an end of the second channel facing the banknote dispensing port is further arranged with multiple raised ribs.

9. The banknote validation device having the rapid replacement panel according to claim 1, wherein the lower end of the first channel is further arranged with a light guide plate, and the circuit board is further arranged with at least one light source emitting light towards the light guide plate.

* * * * *